United States Patent [19]

Bowin

[11] 4,058,685
[45] Nov. 15, 1977

[54] INTEROFFICE LOOP SUPERVISION ARRANGEMENT

[75] Inventor: William Ferdinand Bowin, Galion, Ohio

[73] Assignee: North Electric Company, Galion, Ohio

[21] Appl. No.: 743,113

[22] Filed: Nov. 19, 1976

[51] Int. Cl.² .............................................. H04M 7/00
[52] U.S. Cl. .............................................. 179/18 AH
[58] Field of Search ................... 179/18 AH, 78 R, 79

[56] References Cited

U.S. PATENT DOCUMENTS 3,391,252  7/1968  Germanton .................... 179/18 AH

*Primary Examiner*—William C. Cooper
*Attorney, Agent, or Firm*—Charles M. Hutchins

[57] ABSTRACT

An arrangement for preventing false reseizures of loop-signaling, repeat coil-coupled interoffice trunk circuits for telephone switching systems is disclosed. In the prior art, false reseizures of an incoming trunk circuit can be caused by discharge of the midpoint capacitor at the facility side of the repeat coil bridge of an associated outgoing trunk circuit at the opposite terminus of the interoffice trunk facility. During the talk state, this midpoint capacitor is charged approximately to the signaling battery supply level with polarity such that, upon termination of the talk state and accompanying tip-ring reversal, the capacitive discharge is sufficient to reoperate the supervisory relay in the distant office incoming trunk circuit, thereby generating a false reseizure attempt. By placing said midpoint capacitor within a diode bridge at the outgoing trunk circuit, the charge built up thereon is prevented from assuming a polarity necessary to initiate such false reseizures while simultaneously allowing for normal operation of said outgoing trunk circuit.

6 Claims, 2 Drawing Figures

INTEROFFICE LOOP SUPERVISION ARRANGEMENT

BACKGROUND OF THE INVENTION

1. Field of the Invention

This invention relates to interoffice DC loop signaling arrangements for communication switching systems and more particularly to solutions of false reseizure problems attributable to facility-side midpoint capacitors associated with repeat coils utilized in certain loop-signaling interoffice telecommunication trunk circuits.

2. Description of the Prior Art

Known interoffice trunks providing for metallic voice circuits between communication switching systems commonly employ DC supervisory and address signaling methods. Such methods utilize open and closed DC current loops, as well as normal and reverse battery potential across the two-wire facility, in conjunction with trunk circuit supervisory relays and/or reverse battery detector circuits to convey signaling information between trunk circuits terminating the end points of the interoffice trunk facility. Such trunk circuits are commonly known in the art as loop-signaling or loop-dial trunk circuits.

Additionally, as is well-known in the art, many of such trunk circuits employ impedance matching transformers commonly known as repeat coils. Repeat coils are characterized as having a pair of windings on both the primary and secondary of the impedance matching transformer, each pair interconnected by so-called midpoint capacitors. Rather than using the terms primary and secondary with reference to the transformer windings, the terms office-side and facility-side are used when discussing repeat coils. These designations flow naturally from considering that which happens to be connected to a particular side of a repeat coil under discussion — i.e. the telephone switching office, or "office-side," or the interoffice transmission trunk facility, or "facility-side."

Such prior art loop-signaling incoming trunk circuits with repeat coil coupling, may encounter false reseizure problems at the termination of the talk state due to charge build-up on the facility-side repeat coil midpoint capacitors in the outgoing trunk circuits. Under such a condition, the facility-side midpoint capacitor in the outgoing trunk circuit may discharge during the newly-initiated idle trunk state in a manner resulting in the incorrect operation of a supervisory relay in the incoming trunk circuit at the distant office. Indeed, such a false reseizure, under certain conditions, may become reiterative, resulting in a condition known as "flipping," wherein the distant office incoming trunk circuit is repetitively falsely seized over a prolonged time interval. Such false incoming trunk seizures are accompanied by false requests for common control circuit elements such as incoming registers, thus degrading service efficiency at the distant office associated with the incoming trunk circuit.

SUMMARY OF THE INVENTION

Accordingly, it is an object of this invention to provide an arrangement in a loop-signaling, repeat coil-coupled trunk circuit for preventing false reseizures of the corresponding distant office trunk circuit.

The trunk circuit's facility-side repeat coil midpoint capacitor is placed within a full-wave rectifier circuit whose input terminals are respectively connected to the repeat coil's facility-side windings. With this arrangement, said facility-side midpoint capacitor is prevented, during the trunk talk state, from charging with a DC polarity necessary to initiate reoperation of the supervisory relay of the distant office trunk circuit at the termination of the trunk talk state.

BRIEF DESCRIPTION OF THE DRAWING

The invention will best be understood from a reading of the following description of an illustrative embodiment taken in conjunction with the drawing in which.

DESCRIPTION OF THE ILLUSTRATIVE EMBODIMENT

Figure 1:
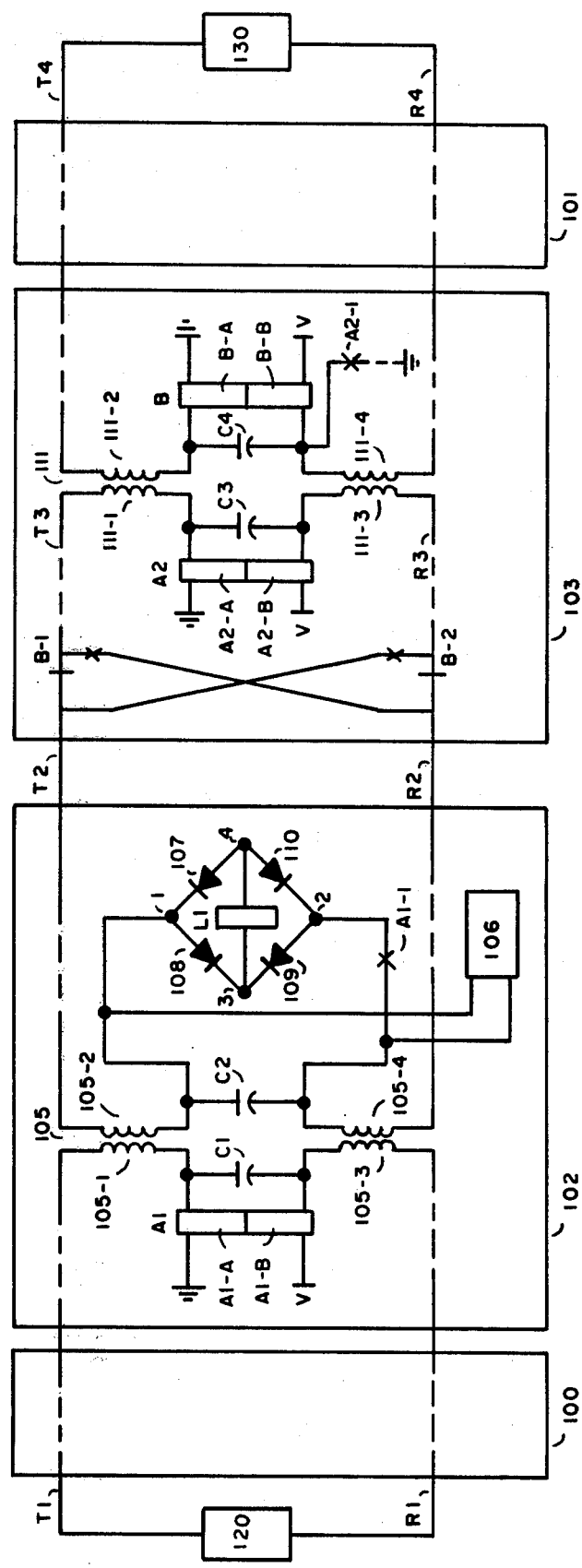
FIG. 1 depicts pertinent portions of an outgoing trunk circuit and its corresponding distant office incoming trunk circuit as utilized in the prior art.

The invention is best understood by initially considering a typical interoffice trunk signaling operation of the prior art. An exemplary prior art interoffice configuration of an outgoing trunk circuit at a local switching office connected to an incoming trunk circuit at a distant switching office is depicted in FIG. 1.

It is to be noted with reference to all figures of the drawing that dashed lines are used at various points therein to indicate that the path shown proceeds via various elements such as logic relay contacts which are not pertinent to the invention and which are therefore not specifically shown. It is also to be noted with reference to the drawing that the well-known detached relay contact schematic symbology is employed throughout. Each relay contact so depicted is designated in the drawing in a manner which indicates the relay of which it is a part. For example, in FIG. 1, the make contact designated A1-1 in the outgoing trunk circuit 102 indicates that this is contact 1 of relay A1.

Referring to FIG. 1, calling party 120 at switching office 100 is shown coupled to called party 130 at switching office 101. Calling party 120 is connected via the switching matrix (not specifically shown) of office 100 to outgoing trunk circuit 102 via the normal two-wire pair commonly designated tip and ring, herein designated in FIG. 1 as T1, R1, to the office-side of repeat coil 105 of outgoing trunk circuit 102, namely office-side windings 105-1 and 105-3. The opposite end of winding 105-1 is connected to one terminal of office-side midpoint capacitor C1 and to a first terminal of the upper coil A1-A of relay A1. The opposite end of winding 105-3 is connected to the opposite terminal of office-side midpoint capacitor C1 and to a first terminal of the lower coil A1-B of relay A1. Coil A1-A has a second terminal connected to ground potential, while coil A1-B has a second terminal connected to office battery potential, V.

The facility-side of repeat coil 105, namely facility-side windings 105-2 and 105-4, is coupled to the interoffice transmission facility conductors T2 and R2. The opposite end of winding 105-2 is connected to one terminal of facility-side midpoint capacitor C2, one terminal of reverse battery detector 106, and input node 1 of a full-wave rectifier bridge comprised of diodes 107, 108, 109 and 110. The opposite end of winding 105-4 is connected to the opposite terminal of capacitor C2, a second terminal of reverse battery detector 106, and to input node 2 of the full-wave rectifier bridge via make contact A1-1 of relay A1. Loop signaling impedance means, comprising relay coil L1, is coupled between the output nodes 3 and 4 of the full-wave rectifier bridge.

As used herein, the term "input nodes" used with reference to a full-wave rectifier bridge refers to those nodes of the bridge which will accept bidirectional current flow in the medium connected between said "input nodes," while the term "output nodes" refers to those nodes of the bridge which will permit only a predetermined unidirectional current flow in the medium connected between said "output nodes." Input nodes are sometimes designated "AC nodes," since bidirectional current flow is possible therebetween, while output nodes are sometimes designated "DC nodes," since only unidirectional current flow is possible therebetween.

Interoffice transmission facility conductors T2 and R2 are terminated at their opposite extremes in incoming trunk circuit 103. As shown in FIG. 1, conductor T2 is coupled to conductor T3 of incoming trunk circuit 103 via the break contact portion of transfer contact B-1, and conductor T2 is also coupled to conductor R3 of incoming trunk circuit 103 via the make contact portion of transfer contact B2. In a symmetric manner, conductor R2 is coupled to conductor R3 of incoming trunk circuit 103 via the break contact portion of transfer contact B-2, and conductor R2 is also coupled to conductor T3 of incoming trunk circuit 103 via the make contact portion of transfer contact B-1.

Conductors T3 and R3 are respectively coupled to first terminals of facility-side repeat coil windings 111-1 and 111-3, of repeat coil 111. The opposite end of winding 111-1 is connected to one terminal of facility-side midpoint capacitor C3 and to a first terminal of the upper coil A2-A of relay A-2. The opposite end of winding 111-3 is connected to the opposite terminal of facility-side midpoint capacitor C3 and to a first terminal of the lower coil A2-B of relay A2. Coil A2-A has a second terminal connected to ground potential, while coil A2-B has a second terminal connected to office battery potential, V.

The office-side of repeat coil 111, namely office-side windings 111-2 and 111-4, is coupled to conductors T4 and R4, thence through the switching matrix (not specifically shown) of distant office 101 to called party 130.

The opposite end of winding 111-2 is connected to one terminal of office-side midpoint capacitor C4 and to a first terminal of upper coil B-A of relay B. The opposite end of winding 111-4 is connected to the opposite terminal of midpoint capacitor C4, a first terminal of lower coil B-B of relay B, and to make contact A2-1 of relay A2. The opposite side of contact A2-1 is coupled to ground potential via trunk relay logic not critical to the invention and hence not specifically shown.

As seen from the arrangement of FIG. 1, an off-hook calling party 120 requesting the communication connection, on being connected via office 100 to outgoing trunk circuit 102, will cause the operation of supervisory relay A1. In turn, the closing of make contact A1-1 provides a signaling loop forward on leads T2 and R2 to incoming trunk circuit 103 thereby causing operation of supervisory relay A2. An inductive signaling loop forward to the distant office provided by relay L1 of outgoing trunk circuit 102 is utilized to provide for minimal AC transmission loss at repeat coil 105. The full-wave rectifying diode bridge comprised of diodes 107, 108, 109 and 110 is placed around relay L1 to force DC inter-office loop current to flow in only one direction through the inductive winding of L1. This forced unidirectional DC current flow is required to prevent dropping of the A2 relay in incoming trunk circit 103 upon subsequent battery polarity reversals at leads T2 and R2.

For the exemplary embodiment, assume that incoming trunk circuit 103 is equipped with the well-known dial-stop option, wherein a battery polarity reversal is returned to the calling office via the T2 and R2 conductors upon seizures of incoming trunk circuit 103 and is maintained thereon until a suitable registering device is attached for receipt of address signaling information (e.g. dial pulses). Such dial-stop operation is enabled as represented in FIG. 1 by make contact A2-1 closing an operating path to ground potential for the lower coil B-B of relay B whenever a seizure of incoming trunk circuit 103 is indicated by the operation of supervisory relay A2. Battery reversal back to outgoing trunk 102 is then provided by B relay transfer contacts B-1 and B-2.

The reversal is recognized at outgoing trunk circuit 102 via reverse battery detector 106. Detector 106 may comprise one of several forms well-known in the art. For example, detector 106 could be comprised of a polar relay, operable only by a predetermined polarity of the potential appearing across conductors T2 and R2.

When an appropriate register has been attached at incoming trunk circuit 103, relay B is released (by logic contacts not specifically shown) to inform originating office 100, via transfer contacts B-1 and B-2 and detector 106, to begin outpulsing of address information required for completing the desired connection through office 101 to called party 130. When called party 130 answers, supervisory relay B of incoming trunk circuit 103 will reoperate over the subscriber loop via conductors T4 and R4.

Hence, as seen from the arrangement of FIG. 1, when calling party 120 is in communication with called party 130 over the connection shown — i.e., in the so-called talk state of the trunk, supervisory relay A1 of outgoing trunk circuit 102 and supervisory relays A2 and B, both of incoming trunk circuits 103, will all be operated. It is thus apparent from FIG. 1 that, as a result of the talk state, the facility-side midpoint capacitor C2 of outgoing trunk circuit 102 will charge approximately to the office battery potential V, with the side of C2 connected to winding 105-2 assuming an approximate voltage potential V, with respect to ground potential appearing at the side of C2 connected to winding 105-4. The potential across C2, as seen from FIG. 1, is derived from battery and ground supply at the coils A2-A and A2-B of supervisory relay A2 of incoming trunk circuit 103, fed back to C2 via operated transfer contacts B-1 and B-2 of incoming trunk circuit 103.

The previously-discussed "flipping" problem with the A2 relay arises in connection with conditions immediately following a termination of the trunk talk state wherein calling party 120 initially terminates the communication by going on-hook at his subscriber set. The sequence of events pertinent to the problem of "flipping" is as follows. When calling party 120 goes on-hook, relay A1 of outgoing trunk circuit 102 releases thus removing via opening of contact A1-1, the loop forward to incoming trunk circuit 103 resulting in the release therein of relay A2. Now assume called party 130 goes on-hook thereby releasing supervisory relay B of incoming trunk circuit 103. Release of relay B restores transfer contacts B-1 and B-2 to the released state thus placing pre-charged midpoint capacitor C2 of outgoing trunk circuit 102 across relay A2 via the T2 and R2 conductors with charge polarity capable of reoperating relay A2 via the discharging of C2. However, A2 in reoperating will, in turn, reoperate relay B which will again reverse polarities at the T2, R2 conductors via contacts B-1 and B-2. The polarity reversal will now re-release relay A2 and thence release relay B via opening of contact A2-1, and the "flipping" sequence will begin anew. This looped sequence will continue until the charge on midpoint capacitor C2 decreases to a level insufficient to falsely reoperate relay A2 of incoming trunk circuit 103.

Hence, as seen from the discussion set forth hereinabove, the so-called "flipping" problem stems from the initial talk state charge condition placed on the facility-side midpoint capacitor C2 of the outgoing trunk circuit 102 with a reverse polarity via transfer contacts at the distant office incoming trunk circuit. The instant invention serves as a solution to the flipping problem by providing for the placement of the facility-side midpoint capacitor of the outgoing trunk circuit within a full-wave rectifying means, thus preventing said midpoint capacitor from ever being exposed to said reverse polarity.

Figure 2:
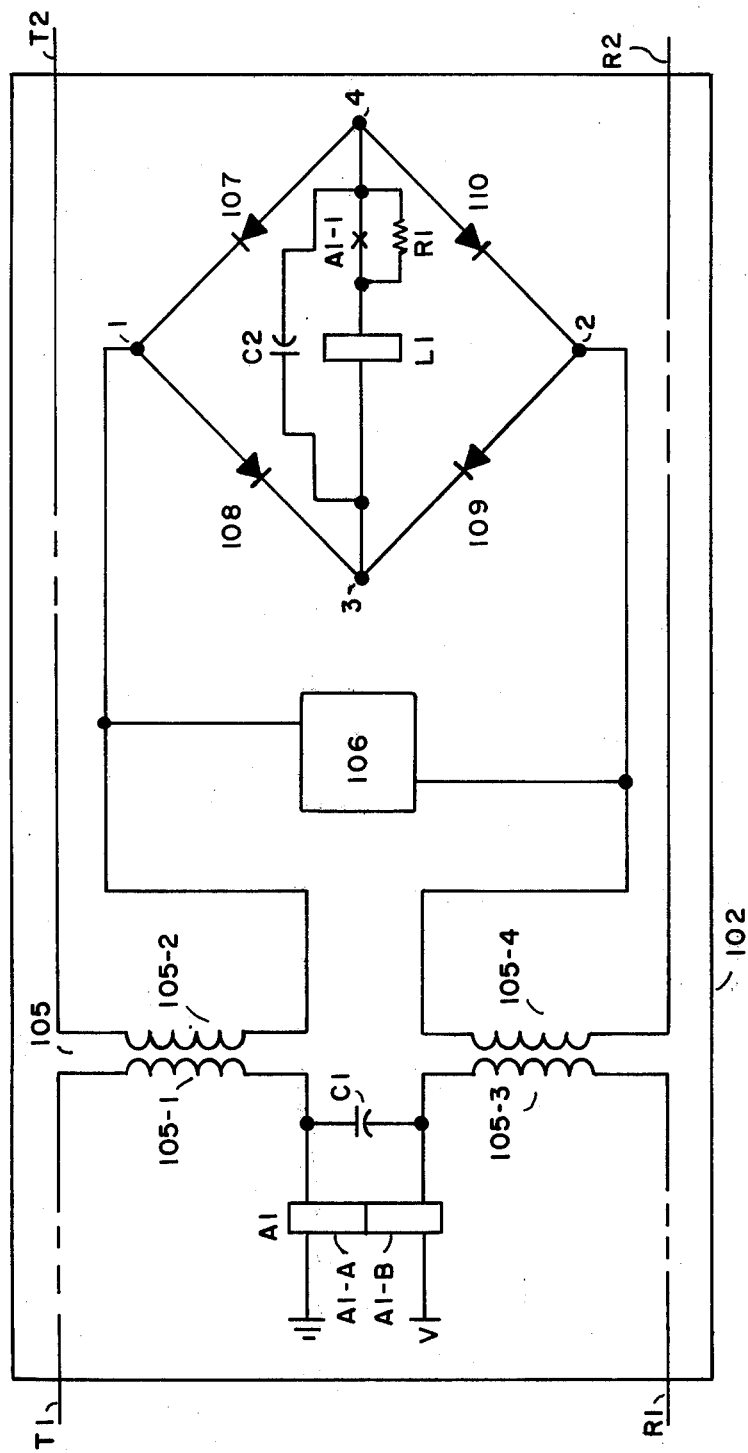
FIG. 2 depicts the outgoing trunk circuit of FIG. 1 modified in accordance with the principles of the invention.

FIG. 2 depicts the outgoing trunk circuit of FIG. 1 modified in accordance with the principles of the invention. All elements carried over from FIG. 1 have been given the same designation in FIG. 2. The circuit of FIG. 2 represents the best embodiment of the invention from an economic standpoint, in that the diode bridge used in the prior art outgoing trunk circuit of FIG. 1 is, in accordance with the principles of the invention, retained in FIG. 2 for the additional purpose of isolating midpoint capacitor C2 from the consequences of signaling battery polarity reversal on the T2 and R2 conductors. As seen from FIG. 2, facility-side midpoint capacitor C2 has been placed across the output nodes 3 and 4 of the diode bridge in parallel with the loop-forward relay L1. Additionally, to ensure the normal operation of outgoing trunk circuit 102 with the structural alterations involving capacitor C2, make contact A1-1 of relay A1 has also been placed within the diode bridge in series with the coil of relay L1. Since the trunk circuit may, in situations such as coin control on paystation calls, be required to pass voiceband multifrequency signals back via the repeat coil 105 into office 102 (FIG. 1) even when relay A1 is released, contact A1-1 of relay A1 is also placed within the diode bridge comprised of diodes 107, 108, 109 and 110 of FIG. 2. Resistor R1 of FIG. 2 is placed in parallel with contact A1-1 to maintain a low impedance path through the diode bridge to allow for passage of signals, such as voiceband coin control signals, through midpoint capacitor C2 even when relay A1 of trunk circuit 102 is released. R1 is selected to have a resistance value low enough to provide for appropriate diode forward bias, yet high enough to prevent false operation of relay A2 of incoming trunk circuit 103 of FIG. 1. For example, with typical central office battery of −48 volts supplied via supervisory relay A2 (FIG. 1), a suitable value for resistor R1 has been found to be 47,000 ohms.

It will be apparent to those skilled in the telephony art that, with the arrangement of trunk circuit 102 depicted in FIG. 2, facility-side midpoint capacitor C2 is effectively prevented from charging with a polarity capable of falsely reoperating relay A2 of incoming trunk circuit 103 of FIG. 1 upon the termination of the trunk talk state where the release of relay B (FIG. 1) reverses the polarity of conductors T2 and R2. At the same time, the arrangement of FIG. 2 provides for normal signaling and voice transmission operation of outgoing trunk circuit 102. Hence, the prior art problem of "flipping" is overcome using the illustrative embodiment of FIG. 2 at the additional cost over the prior art of a single resistor.

It should be noted that the invention described herein has been illustrated with reference to a particular embodiment. It is to be understood that many details used to facilitate the description of said embodiment were chosen for convenience only and without limitation on the scope of the invention. Other embodiments may be devised by those skilled in the art without departing from the scope and spirit of the invention. For example, a separate and distinct diode bridge could be placed around facility-side midpoint capacitor C2 of FIG. 1 in a "brute force" approach to implementing the principles of the flip-preventing invention. Accordingly, the invention is intended to be limited only by the scope and spirit of the appended claims.

What is claimed is:

1. In a loop signaling interoffice communication trunk circuit, transformer-coupled to the interoffice transmission facility via a repeat coil, the improvement comprising;

full-wave rectification means having first and second input nodes respectively coupled to one terminal of first and second facility-side windings of said repeat coil and having first and second output nodes across which is coupled the facility-side midpoint capacitor for said repeat coil, said full-wave rectification means operative as connected to force said facility-side midpoint capacitor to charge with a single predetermined DC polarity.

2. A loop-signaling interoffice communication trunk circuit comprising;

a repeat coil having first and second office-side windings and first and second facility-side windings, and first and second office-side windings each having a first terminal respectively coupled to opposite sides of an office-side midpoint capacitor and each having a second terminal respectively coupled to opposite sides of a two-wire office-side communication path, said first and second facility-side windings each having a first terminal respectively coupled to first and second input nodes of a full-wave rectification means and each having a second terminal respectively coupled to opposite sides of a two-wire facility-side communication path, supervision means coupled to said two-wire office-side communication path for sensing the direct-current conductivity state of said office-side path, a facility-side midpoint capacitor coupled between first and second output nodes of said rectification means, switching means operative to couple an impedance means between said first and second output nodes whenever said supervision means senses a high direct current conductivity state of said office-side path, and biasing means coupled across said first and second output nodes for sustaining an alternating-current path through said rectification means regardless of the direct-current conductivity state of said office-side path.

3. The communication trunk circuit of claim 2 wherein said supervision means comprises:

a first electromechanical relay having first and second coils, said first coil coupled between a first side of said office-side path and a first reference potential source, and said second coil coupled between a second side of said office-side path and a second reference potential source.

4. The communication trunk circuit of claim 3 wherein said switching means comprises a normally-open electromechanical relay contact actuated by direct current flow in said first and second coils of said first electromechanical relay.

5. The communication trunk circuit of claim 2 wherein said impedance means comprises a single coil of a second electromechanical relay.

6. The communication trunk circuit of claim 2 wherein said biasing means comprises a resistor having a resistance value approximately one order of magnitude greater than the resistance value of said impedance means.

* * * * *